United States Patent
Talbot et al.

(10) Patent No.: US 6,826,179 B1
(45) Date of Patent: Nov. 30, 2004

(54) PACKET CHANNEL IMPLEMENTATION

(75) Inventors: Michael S. Talbot, Sandy, UT (US); J. Kendall Anderson, Taylorsville, UT (US); Lori K. Eckles, Sandy, UT (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 09/521,815

(22) Filed: Mar. 9, 2000

(51) Int. Cl.[7] .............................................. H04L 12/56
(52) U.S. Cl. ...................... 370/389; 370/394; 370/471; 370/474; 370/476
(58) Field of Search ................................ 370/389, 392, 370/394, 395.3, 402, 438, 463, 470, 471, 472, 474, 476, 503

(56) References Cited

U.S. PATENT DOCUMENTS

| | | | |
|---|---|---|---|
| 5,850,400 A | * | 12/1998 | Eames et al. ............... 370/443 |
| 5,870,394 A | | 2/1999 | Oprea ......................... 370/392 |
| 6,122,281 A | * | 9/2000 | Donovan et al. ............ 370/401 |
| 6,201,813 B1 | * | 3/2001 | Klausmeier et al. ........ 370/412 |
| 6,396,853 B1 | * | 5/2002 | Humphrey et al. .......... 370/535 |
| 6,483,854 B1 | * | 11/2002 | Klausmeier et al. ........ 370/474 |

* cited by examiner

Primary Examiner—Chi Pham
Assistant Examiner—Anh-Vu H Ly
(74) Attorney, Agent, or Firm—Perman & Green, LLP

(57) ABSTRACT

A method of formatting a data packet frame for transmitting a data signal in a contiguous sequence over a channel. The method comprises determining the length of the data signal and appending a header to the data signal. Preferably, the header includes information corresponding to the length of the data signal. In the preferred embodiment, the information corresponding to the length of the data signal is used by the recipient to receive the data signal in the contiguous sequence.

21 Claims, 6 Drawing Sheets

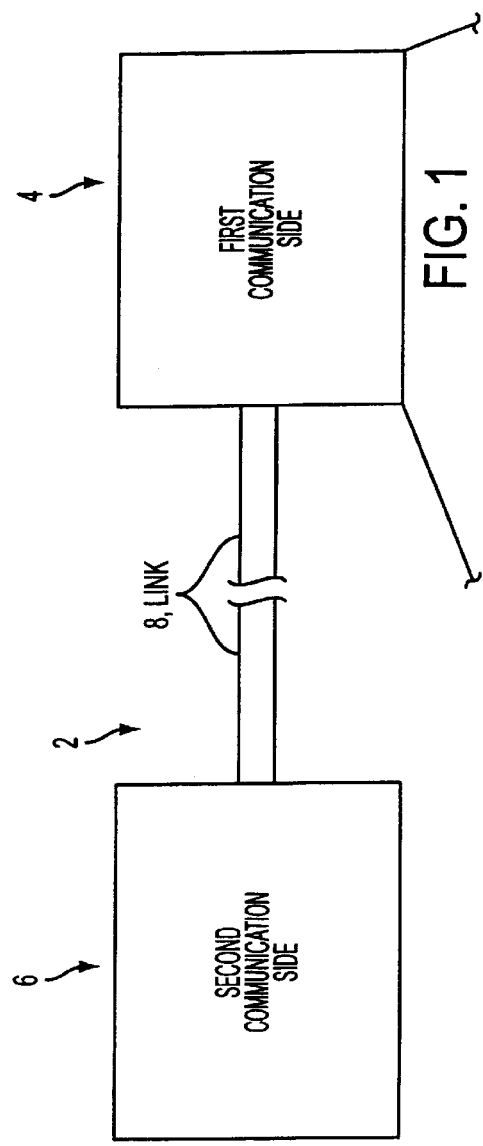
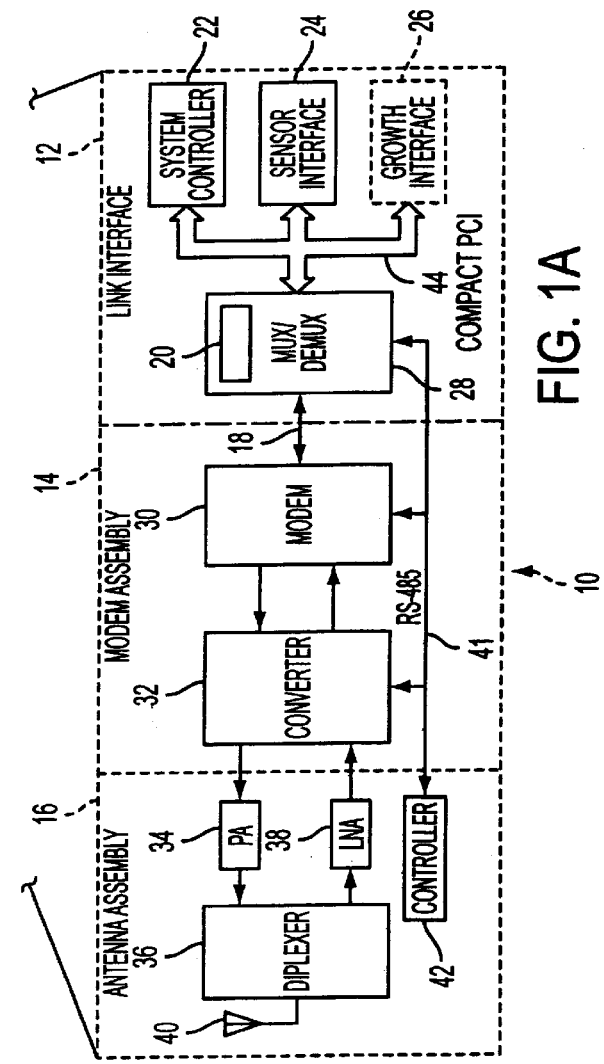

PACKET CHANNEL IMPLEMENTATION

This invention was made with Government support under Agreement No. MDA972-97-C-0804 awarded by DARPA. The Government has certain rights in the invention.

BACKGROUND OF THE INVENTION

1. Field of the Invention

The present invention relates generally to data communications systems and, more particularly to, a method of transferring a data signal in a contiguous sequence over a channel.

2. Prior Art

Typically, a data signal is transmitted over a channel in a fixed length data packet. The source of the data signal, typically a sensor, is generally allocated to a fixed slot or port, and communication systems are limited by the number and types of sensors that can be used. The addition of a sensor generally requires reconfiguring the hardware of the system.

The size of a channel, or the amount of information that can be transmitted over the channel in one packet is also limited. Typically, the data signal is broken down into a variable number of fixed size data packets, each having its own header and identifier. The data packets are transmitted over the link and must be reorganized and reassembled into the original message on the receiving side. For example, U.S. Pat. No. 5,870,394 to Oprea discloses a method and apparatus for the reassembly of data packets into messages. In Oprea, messages are defined into a plurality of data packets having respective header and payload portions. The header portion includes information related to the channel associated with the data packet and whether or not the data packet is the final data packet in the message. The reassembly processor must reassemble the different data packets from different channels into a contiguous message format.

SUMMARY OF THE INVENTION

The present invention is directed to, in a first aspect, a method of formatting a data packet frame for transmitting a data signal in a contiguous sequence over a channel. The method comprises determining the length of the data signal and appending a header to the data signal. Preferably, the header includes information corresponding to the length of the data signal. In the preferred embodiment, the information corresponding to the length of the data signal is used by the recipient to receive the data signal in the contiguous sequence.

In another aspect, the present invention is directed to a method of sending data from a source to a recipient over a channel in a contiguous sequence. The method comprises appending a header to the data signal, the header including a length information corresponding to a length of the data signal, and transmitting the header and data signal over the channel. In the preferred embodiment, the data signal is transmitted in a contiguous sequence. The method further comprises receiving the header and data signal, and using the length information corresponding to the length of the data signal to receive the data signal aligned in the same contiguous sequence as it was transmitted.

BRIEF DESCRIPTION OF THE DRAWINGS

The foregoing aspects and other features of the present invention are explained in the following description, taken in connection with the accompanying drawings, wherein:

FIG. 1 is a block diagram of a data communication system incorporating features of the present invention.

FIG. 1A is a schematic diagram of architecture of one side a communication system embodying features of the present invention.

FIG. 4A is a block diagram of a data packet embodying features of the present invention.

FIG. 4B is a block diagram of a header in a data packet frame embodying features of the present invention.

FIG. 4C is a block diagram of a packet control word embodying features of the present invention.

FIG. 4D is a block diagram of a stream ID portion of a packet control word embodying features of the present invention.

DETAILED DESCRIPTION OF THE PREFERRED EMBODIMENT

Figure 2:
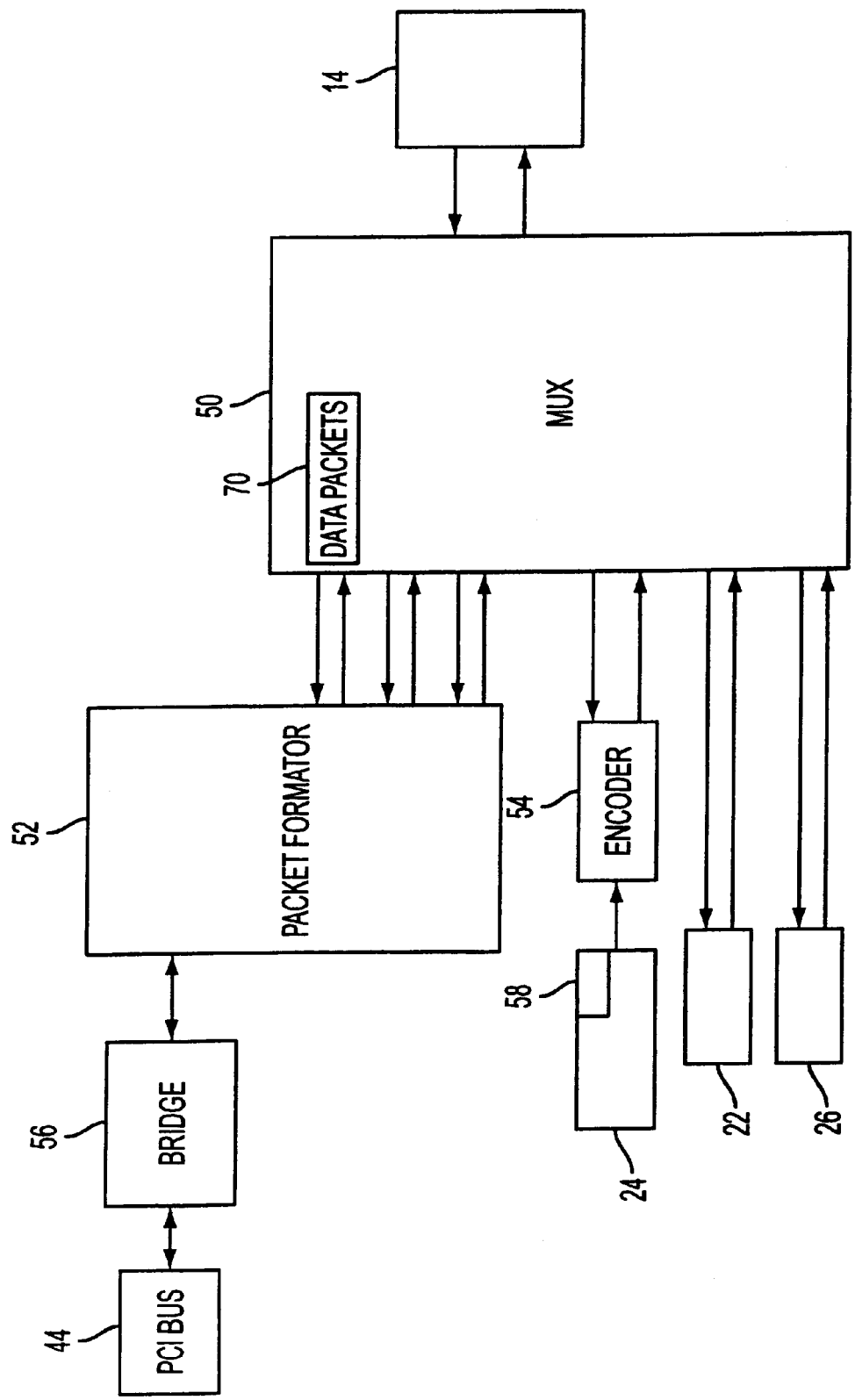
FIG. 2 is a schematic diagram of a multiplexer embodying features of the present invention.

Referring to FIG. 1, a block diagram of a data communication system 2 incorporating features of the present invention is shown. Although the present invention will be described with reference to the single embodiment shown in the drawings, it should be understood that the present invention can be embodied in many alternate forms of embodiments. In addition, any suitable size, shape or type of elements or materials could be used.

The data communications system 2 generally comprises two communication sides 4 and 6, typically coupled by a link 8 or a channel, also called a packet channel or superchannel. The sides 4, 6 can function as a transmitter and a receiver. For descriptive purposes only, the first side 4 will be referred to hereafter as a transmit side and the second side 6 will be referred to as a receive side. In one embodiment, the transmit side 4 and receive side 6 could comprise transmitters and receivers coupled by link 8. The link 8 could comprise any conventional data communication coupling means including for example, a hardwire connection, a fiber-optic connection, a radio frequency ("RF") link, a microwave link, a telephone link, or a common data link ("CDL"). In the preferred embodiment, the link 8 is a tactical common data link ("TCDL").

Generally, the hardware or architecture on both the transmit side 4 and the receive side 6 of system 2 can be equivalent. Therefore, side 10, as shown in FIG. 1A, will be described in detail herein as being usable as either side 4 or side 6 in the system 2 of FIG. 1.

As shown in FIG. 1A, the communication system 10 generally comprises a link interface 12, a modem assembly 14 and an antenna assembly 16. In an alternate embodiment, the communication system could comprise data communication hardware other than including the architecture depicted in FIG. 1A.

The link interface 12 typically includes a link interface controller 22, a sensor interface 24, a growth interface 26, a communication bus 44 and a multiplexer/demultiplexer ("mux/demux") 28. The link interface controller is typically adapted to control the flow of data and signals to and between the components of link interface 12. Preferably, the link interface controller 22 is adapted to control the flow of data and signals along the bus 44. In an alternate embodiment, the flow of data in link interface 12 could be controlled by any suitable device, including other than link interface controller 22. Generally, the bus 44 is used to couple the devices and electronics of link interface 12. However, any suitable means may be used to electrically couple the devices of link interface 12, including other than bus 44. In the preferred embodiment, the bus 44 is a peripheral component interconnect ("PCI") bus. The PCI bus is an industry standard 32-bit, 33-megahertz ("mhz") bus. In an alternate embodiment, the bus 44 could include any suitable connection means, including other than a PCI bus, such as a SLOT1 bus.

Typically, the sensor interface 24 includes a network of sensors or devices associated with the sensors. Preferably, a sensor is adapted to provide a data signal to the system 10 on the transmit side 4, and a device is adapted to receive the data signal on the receive side 6. In an alternate embodiment, the data signal may be received from any suitable source, including other than sensor network 24. On the transmit side 4, the sensor network 24 typically includes one or more sensors. On the receive side 6, the sensor network 24 typically includes one or more devices, each device corresponding to a sensor on the transmit side 4. For example, a number of Moving Pictures Expert Group ("MPEG") encoders could be sending data from an airborne unit over the link 8. When the data is received by the ground unit on the receive side 6, the data can be routed to the corresponding MPEG decoder through sensor interface 24. The sensor network 24 may typically include, for example, MPEG, Synthetic Aperture Radar ("SAR") and acoustic sensors and devices. In the preferred embodiment, the sensors and devices in the sensor interface 24 are PCI compatible or compliant. A feature of the present invention is that multiple PCI agent/sensors can be adapted to send data over the link 8 via a superchannel, also referred to as a packet channel. In the preferred embodiment, the data communications system 2, including both the transmit side 4 and the receive side 6, should be able to adapt to any type of sensor with minimal software changes. From a hardware perspective, the integration of new sensors and devices, into sensor network 24 should be transparent.

Figure 3:
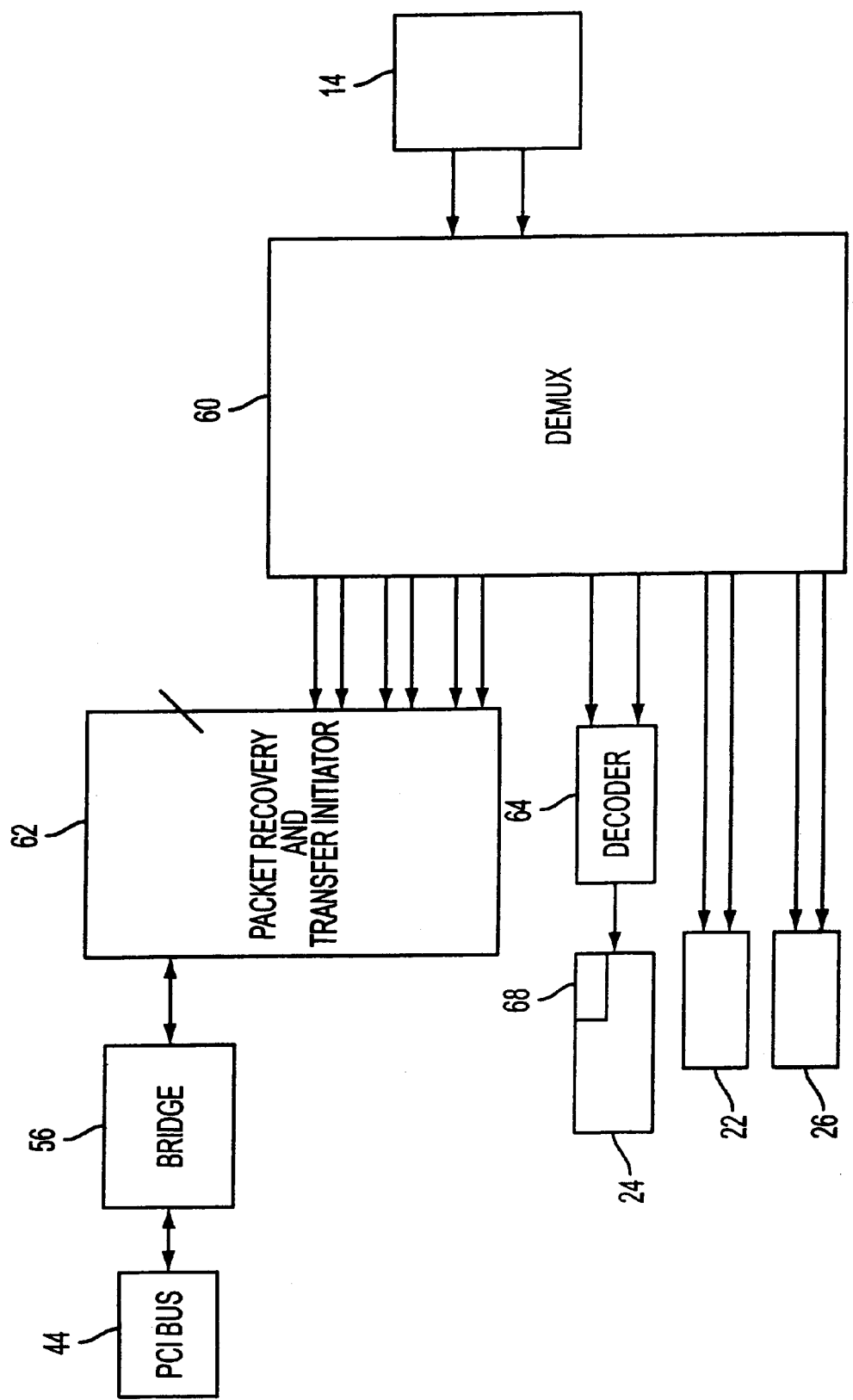
FIG. 3 is a schematic diagram of a demultiplexer embodying features of the present invention.

The multiplexer/demultiplexer ("mux/demux") 28 is typically adapted to format or deformat a data signal in accordance with features of the present invention. Typically, the mux/demux 28 is adapted to communicate with, or provide an interface between, the sensor interface 24 and the modem assembly 14. Preferably, the mux/demux 28 comprises a circuit card assembly that can operate as a PCI master or slave, and is adaptable to the CompactPCI format. In the preferred embodiment, the mux/demux 28 typically includes a PCI bridge 56 for communication with the PCI bus 44 as shown in FIGS. 2 & 3. In the most preferred embodiment the PCI bridge is an INTEL i960 RX I/O Processor which typically contains a PCI bridge chip, direct memory access ("DMA") controller, memory controller and an i960 processor. In one embodiment, the mux/demux 28 typically provides interfaces for various signals, including, for example, Audio ("CVSD"), asynchronous serial ("RS-422") data, Communication Security ("COMSEC") Key, Transmit ("TX") and Receive ("Rx") Data, Tx and Rx clocks, Command Status (RS-485) signals, and modem remoting. Preferably, the mux/demux 28 is software programmable and hardware reconfigurable.

Figure 4:
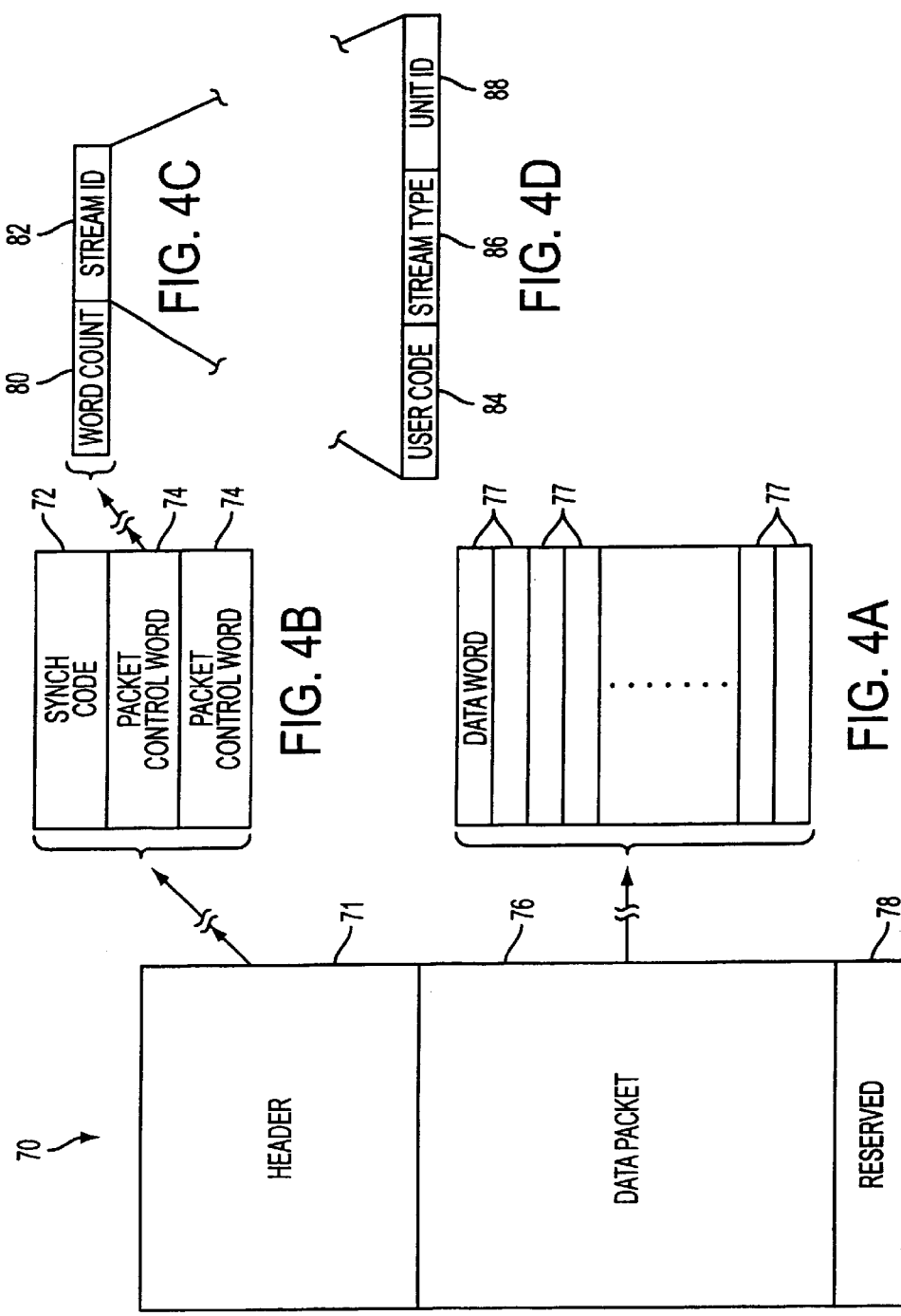
FIG. 4 is a block diagram of a data packet frame embodying features of the present invention.

In the preferred embodiment, the mux/demux 28 includes a packet formatter/deformatter 20. However, the packet formatter/deformatter 20 could be included as circuitry internal or external to mux/demux 28. On the transmit side 4, the packet formatter/deformatter 20 is generally adapted to format the data signal into the data packet frame 70 of the present invention as shown in FIG. 4. On the receive side 6, the mux/demux is typically adapted to deformat a received data packet frame 70. In an alternate embodiment, any suitable device or electronics could be used to format or deformat a data signal, other than including the mux/demux 28.

The growth interface 26 is preferably a PCI compatible interface that allows expansion of the link interface 12 to increase the functionality of the link interface 12 and the communication system 10. The growth interface 26 could include a user interface provided by an expansion card.

In another embodiment, the link interface 12 could also include encryption hardware. In the preferred embodiment, the encryption hardware could be included in the mux/demux 28.

A block diagram of the multiplexer ("mux") portion 50 of the mux/demux 28 is shown in FIG. 2. Generally, the mux 50 comprises a programmable mux in communication with a packet formatter 52. In the preferred embodiment, the mux 50 can be controlled by both hardware and software. The mux 50 may also be in communication with an encoder device 54 receiving a signal from at least one sensor 58 from the sensor interface 24. For example, in one embodiment, the sensor 58 could be a microphone receiving an acoustic data signal that is transmitted through the encoder 54 to mux 50. The acoustic data signal can then be processed by mux 50 and formatted by the packet formatter 52 in accordance with the method of the present invention to produce data packet frame 70. The mux 50 is also typically in communication with the modem interface 14. Preferably, the flow of the data signal through the mux 50 is controlled by link controller 22 in conjunction with bridge 56 and bus 44.

A block diagram of the demux 60 on the receive side of the link 8 incorporating features of the present invention is shown in FIG. 3. The demux 60 is typically adapted to process the data packet frame 70 through the packet recovery and transfer initiator portion 62 of the demux. The recovered data can then be transmitted through the decoder 64 to a device 68 associated with sensor 58 through the sensor interface 24. For example, the acoustic data signal received from the microphone 58 in FIG. 2 is formatted into the data packet frame 70 and transmitted over the link 8. On the receive side 6, the data packet frame 70 may be deformatted by demux 60 and packet recovery portion 62, and then processed through decoder 64 to headphones 68. In an alternate embodiment, the deformatted data can be processed in any suitable fashion, including other than the decoder 64.

The modem interface 14 is typically connected or coupled to the link interface 12 and can be used to facilitate the transmission or receipt of a formatted data packet frame 70. Preferably, the modem interface 14 is coupled to mux/demux 28. In an alternate embodiment, any suitable device can be used to facilitate the sending and receiving of the data packet frame 70, including other than the modem interface 14. In the preferred embodiment, modem interface 14 is a microwave modem assembly and comprises a modem 30 and an radio frequency ("RF") converter.

The connection 18, or coupling means, between the link interface 12 and modem assembly 14 is typically a hardwire connection. However, if the separation between the link interface 12 and modem assembly 14 is greater than 50 meters, the connection 18 could comprise a fiber optic connection. A fiber optic communication interface or modem may be included as part of the link interface 12 and modem assembly 14.

Typically, an antenna assembly 16 is connected to the modem interface 14. Antenna assembly 14 is generally adapted to facilitate the transmission or reception the data packet frame 70. However, in an alternate embodiment, the link 8 between the transmit side 4 and the receive side 6 could include a hardwire connection. Antenna assembly can include any suitable antenna for the transmission or reception of a data signal. In the preferred embodiment, the antenna assembly 16 includes a pre-amplifier ("PA") 34 and a low-noise amplifier ("LNA") 38 connected to a diplexer 36, and an antenna 40 connected to the diplexer 36.

Preferably, the coupling means between the antenna assembly 16 and modem 14 includes a control bus 41 connected to a controller 42, such as for example, a command/status bus. In the preferred embodiment, the bus is an industry standard RS-485 bus.

A general format of the data packet frame 70 incorporating features of the present invention is shown in FIG. 4. Typically, the data packet frame 70 comprises a data packet 76 and a header 71. The data packet frame 70 may also include a reserved section 78. Preferably, the data packet 76 is formatted as a series of one or more data words 77, or long words as shown in FIG. 4A. It is a feature of the present invention that the length of the data packet is variable and includes the entire data signal or message. The capability of varying the length of the data packet may also be referred to as "dynamically allocating the size of the channel." As used herein, the term "dynamically allocate the size of the channel" generally refers to the capability of the present invention to transfer a data signal in a contiguous sequence from the transmit side 4 to the receive side 6 of the channel 8. The data signal can be transferred without having to break the data signal into smaller fixed size data packets, each having its own header or identifier. This ensures that the data signal will be aligned on the receive side 6 in the same way that is was received on the transmit side 4, and avoids having to reassemble the data signal from a plurality of data packets. In the preferred embodiment, the data words 77 are formatted as 32-bit data words. In an alternate embodiment, the data packet could comprise any suitable format, including other than 32-bit data words.

Preferably, the header 71 includes information corresponding to the length of the data packet 76. In the preferred embodiment, the information corresponding to the length of the data packet 76 typically includes the number of data words 77 that comprise the data packet 76. It is a feature of the present invention that the information corresponding to the length of the data packet 76 is used to identify the length of the data signal to allow the entire data packet 76 to be transmitted and received in a contiguous sequence. This guarantees that the data signal propagated to the device 68 on the receive side 6 of the link 8 is aligned in the same way that it is was received by the sensor 58 on the transmit side 4 of the link 8. It is a feature of the present invention that on the transmit side 4 the data packet 76 does not have to be divided up into a number of separate fixed length packet data, each comprising its own header and identifier information. Thus, on the receive side 6 the data packet does not have to be reassembled from the individual packet data, which may be multiplexed with other packet data from other sensors.

The information corresponding to the length of the data packet 76 is generally included in a packet control word 74 in the header 71 as shown in FIG. 4B. In the preferred embodiment, the packet control word 74 is formatted as a 32-bit word. In an alternate embodiment, the packet control word 74 could be formatted in any suitable manner, including other than a 32-bit word. Preferably, the packet control word 74 comprises a word count portion 80 and a stream identifier ("ID") portion 82 as shown in FIG. 4C. The word count portion 80 generally includes the information corresponding to the length of data packet 76. In the preferred embodiment, the word count portion 80 corresponds to the number of data words 77 that comprise the data packet 76. In an alternate embodiment, the word count portion could include any suitable information that identifies the length of data packet 76, including other than the number of data words 77. The stream ID portion 82 generally includes information that corresponds to the intended recipient or device of the data packet 76. As described in the earlier example, if the data packet frame 70 being transmitted includes data from an MPEG encoder, the stream ID portion 82 will include information that is used to route the data to the corresponding MPEG decoder. In the preferred embodiment, the stream ID portion could be formatted as a user code portion 84, a stream type portion 86 and a unit ID portion 88 as shown in FIG. 4D. Preferably, the user code portion 84 corresponds to information related to the format or standard of the data being transmitted, such as for example, a TCDL standard or a proprietary user format. The stream type portion 86 preferably includes information corresponding to the type of data being transmitted such as, for example, acoustic, MPEG, SAR, etc. The unit ID portion 88 preferably includes information corresponding to the sensor or device associated with the data. In an alternate embodiment, the stream ID portion 80 could be formatted in any suitable manner that provides the routing information for the data packet 76. The stream ID portion 80 could also include reserved blocks or portion for other information.

The header 71 may also include a synchronization code 72. The synchronization code 72 is preferably a start of packet synchronization code and is used to identify a transmitted data packet frame 70. In the preferred embodiment, synchronization code 72 is formatted as a 64-bit code, however, in an alternate embodiment, synchronization code 72 could be any suitable number of bits including other than 64-bits. Typically, the value of synchronization code 72 is constant and is stored in a memory storage device. In an alternate embodiment, the synchronization code 72 could formatted in any suitable manner that could be used to identify the data packet frame. In the preferred embodiment, the header 71 comprises a 128-bit header, including the 64-bit synchronization code 72 and the 32-bit packet control word 74 repeated twice. In an alternate embodiment, the header 71 could comprise any number of suitable bits, including other than 128-bits.

Typically, the order of the data packet frame 70 is the header section 71 followed by the data packet 76 and the reserve section 78. However, in an alternate embodiment, the data packet frame 70 could be formatted in any suitable order. Preferably, the order of the header 71 is the synchronization code 72 followed by the packet control word 74. In the preferred embodiment, the packet control word 74 is repeated twice.

Figure 5:
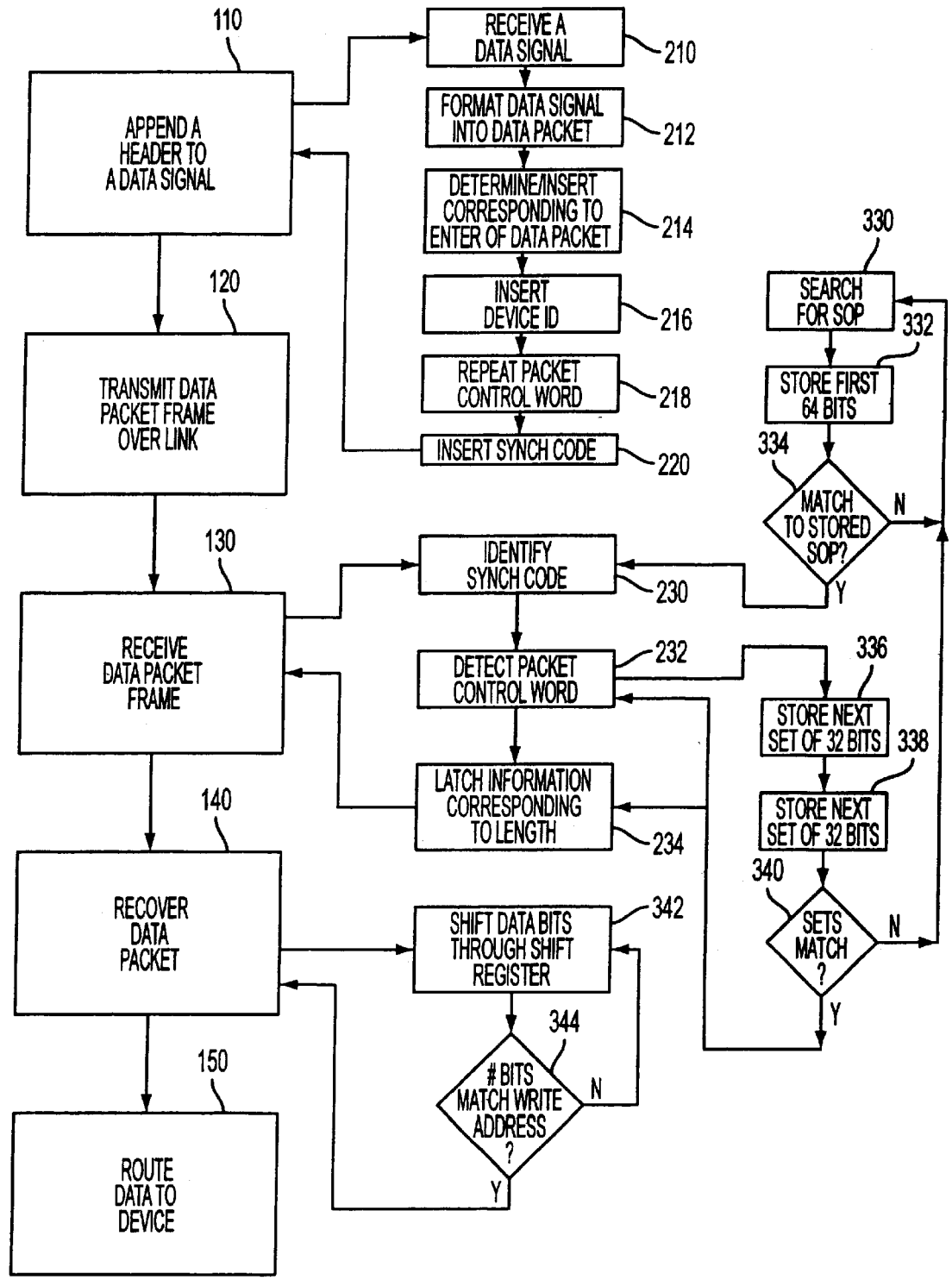
FIG. 5 is a flowchart of one method of sending and receiving data over a channel incorporating features of the present invention.

One embodiment of a method of sending and receiving data packet frame 70 over the link 8 in accordance with the features of the present invention is shown in FIG. 5. Generally, the method comprises appending the header 71 to a data signal as indicated by block 110. In the preferred embodiment, the data signal is formatted as the data packet 76. In an alternate embodiment, the method may also include receiving a data signal from a source as indicated by block 210, formatting the data signal into the data packet 76 as indicated by block 212, and determining the information corresponding to the length of the data packet 76 as indicated by block 214. The information corresponding to the length of the data packet is preferably determined by hardware or software internal to mux/demux 28. However, the information corresponding to the length of the data packet 76 could be determined by any conventional means. The method may also include inserting a device identifier 82 into the header as indicated by block 216, repeating the packet control word 74 twice as indicated by block 218, and appending the start of packet synchronization code 72 into the header as indicated by block 220.

The formatted data packet frame 70 is transmitted over the link 8 as indicated by block 120. In the preferred embodiment, the step of transmitting the data packet frame 70 comprises transmitting the synchronization code 72 followed by the packet control word 74, repeated twice. Transmission of the data packet 76, the actual data signal or message, then follows the header 71. In an alternate embodiment, the method could include transmitting the data packet frame 70 in any suitable order.

The transmitted data packet frame 70 is received on the receive side 6 as indicated by block 130. In the preferred embodiment, the step of receiving the data packet frame could include the steps of identifying the synchronization code 72 as indicated by block 230, detecting the packet control word 74 as indicated by block 232, and latching the information corresponding to the length of the data packet 76 as indicated by block 234.

If there is no data to be sent, the method could include transmitting a fill code word over the link 8. Preferably, the fill code word is a 32-bit data word. The fill code word could be transmitted repeatedly until additional data is sent.

In the preferred embodiment, the receive side 6 is preferably adapted to search for the start of packet synchronization code 72 in the transmitted data packet frame as indicated by block 330. The receive side 6 receives a transmitted signal, preferably comprising data bits. The data bits are shifted into a register as indicated by block 332, which is preferably a 64-bit shift register. The register is preferably internal to the mux/demux 28. The register contents are then compared to a constant start of packet ("SOP") value that corresponds to the synchronization code 72 as indicated by block 334. The constant SOP value can is preferably stored in a random access memory device in the mux/demux 28 circuitry. If a match is found, the synchronization code has been detected. In an alternate embodiment, the method could include detecting the synchronization code 72 in any suitable manner.

Once the synchronization code 72 is detected, the preferred embodiment of the method comprises the step of detecting the packet control word 74 as indicated by block 232. A first set of bits following the synchronization code 72 is stored as indicated by block 336, as is a second set of bits following the first set of bits as indicated by block 338. The two groups of data bits are compared to determine if they are equivalent, or match as indicated by block 340. Preferably, the first set of bits is the first 32-bits following the synchronization code 72, and the second set of bits is the next 32-bits following the first 32-bits. If the second sent of 32-bits matches the first set of the 32-bits, the packet control word 74 is determined to be correct. However, in a alternate embodiment, the method of detecting the packet control word 74 could be any suitable method, other than including comparing a first set of bits to a second set of bits. For example, the packet control word 74 could include an identifying code.

After the packet control word 74 is determined to be correct, the length information corresponding to the length of the data signal is "latched" or stored in a memory storage device as indicated by block 234. In the preferred embodiment, the memory storage device is a RAM device internal to the mux/demux. Preferably, the write address for the RAM will include the information corresponding to the length of the data signal or word count 80.

The data packet 76 is then recovered from the data packet frame 70 as indicated by block 140. In the preferred embodiment, the data bits after the header 71 are transferred to a memory storage unit. Preferably, the data bits comprising the data packet 76 are shifted into the lower 32-bits of a shift register and written to a first in-first out ("FIFO") data storage device as indicated by block 342. In an alternate embodiment, the method could include recovering the data bits comprising the data packet 76 in any suitable manner.

The number of data bits shifted through the shift register is compared to the value of write address of the RAM where the information corresponding to the length of the data packet 76 is stored as indicated by block 344. When the two values match, the entire data packet 76, or data signal, has been recovered.

After the data packet has been recovered, the data packet 76 can be transmitted to the device associated with the data signal as indicated by block 150. In an alternate embodiment, the method could include transmitting the data signal to other than its associated device. In the preferred embodiment, the stream ID 82 in the packet control word 74 is used to route the recovered data packet 76 to its appropriate destination or corresponding device.

Figure 6:
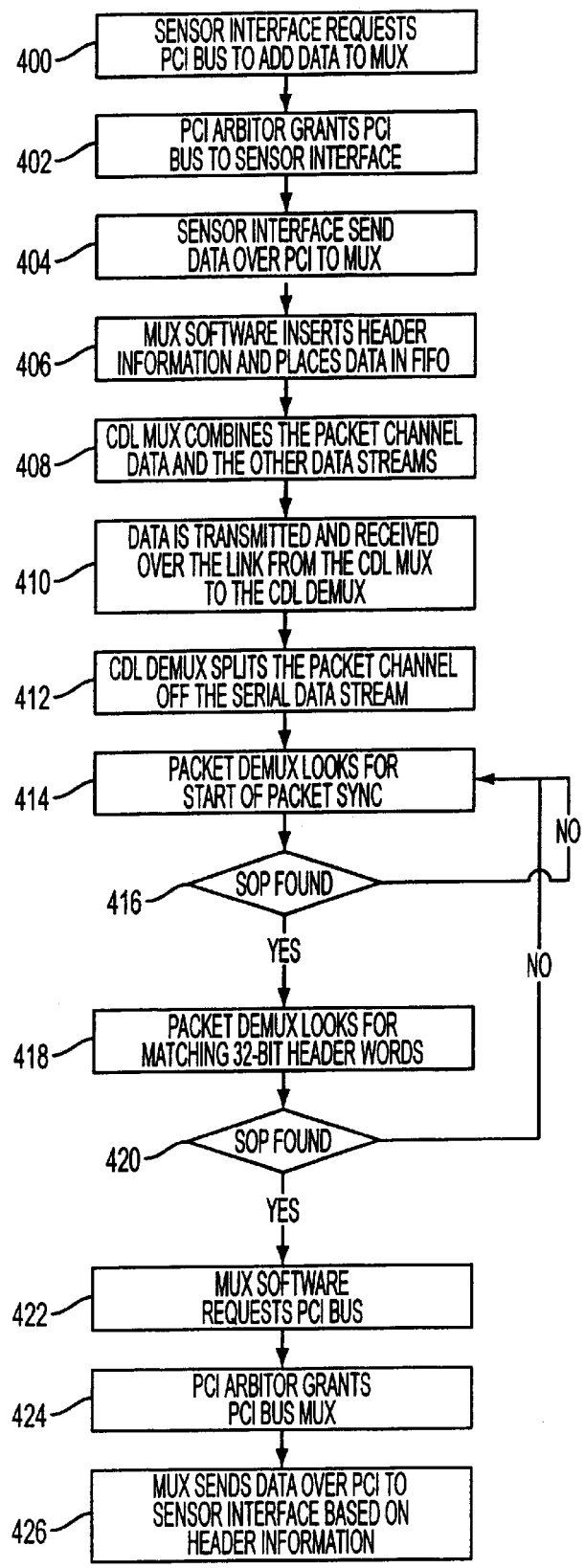
FIG. 6 is a flowchart of another embodiment of a method of sending and receiving data over a channel incorporating features of the present invention.

Another embodiment of a method incorporating features of the present invention is shown in FIG. 6. In this embodiment, the sensor interface 24 initiates a request for the PCI bus 44 in order to send a data signal to the mux/demux 28 as indicated by block 400. Preferably, the sensor interface formats the data signal as a data packet 76. The system controller 22, also called the PCI Arbitor, processes the request and grants the PCI bus 44 to the sensor interface 24 as indicated by block 402, when the bus 44 is available. The sensor interface then sends the data packet 76 over the PCI bus 44 to the mux/demux 28 as indicated by block 404. A computer software program in the mux/demux inserts the header 71 onto the data packet 76 and stores the data packet frame in a memory storage unit in the mux/demux 28 as indicated by block 406. Preferably, the memory storage unit is a FIFO device. The CDL mux 50 could then combine the data packet frame 70 with other data streams as indicated by block 408. The data stream, including the data packet frame 70, can be serialized and transmitted over the link 8 from the CDL mux 50 to the CDL demux 60 as indicated by block 410. On the receive side 6, the CDL demux 60 splits the data packet frame 70 off the serial data stream as indicated by block 412. The demux 60 searches for the start of packet synchronization code 72 as indicated by block 414. Once the start of packet synchronization code 72 is found as indicated by block 416, the demux 60 searches for the matching 32-bit packet control words 74 as indicated by block 418. After confirming that the packet control word 74 is correct as indicated by block 420, the mux/demux 28 software initiates a request for the PCI bus 44 as indicated by block 422. The system controller 22, or PCI Arbitrator, processes the request and if the bus 44 is available, grants the PCI bus 44 to the mux/demux 28 as indicated by block 424. The mux/demux then sends the data packet 76 over the PCI bus 44 to the sensor interface 24 based on the stream ID 82 information contained in the packet control word 74 as indicated by block 428.

By formatting the data packet frame in accordance with the features of the present invention, multiple sensor data can be transmitted over the link 8 without the need to divide the data into different fixed sized packet data. Each message is transmitted and received in a contiguous format which ensures that the data will be aligned on the receive side 6 in the same way that it was aligned on the transmit side 4. The present invention allows the system 2 to adapt to any type of sensor with only minimal software changes, and allows multiple sensor data to be transmitted over the same channel.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of formatting a data packet frame for transmitting a data signal over a channel comprising the steps of:
    determining a length of the data signal; and
    appending a header to the data signal, the header including information corresponding to the length of the data signal, the information being used to transmit and receive the data signal in a contiguous sequence, the header also including a packet control word repeated twice, the packet control word including at least the information corresponding to the length of the data signal and a device identifier.

2. The method of claim 1 further comprising the step, before the step of determining a length of the data signal, of converting the data signal into a data packet, the data packet comprising at least one data word.

3. The method of claim 2 wherein the step of determining the length of the data signal comprises determining the number of data words formed.

4. The method of claim 1 wherein the step of appending a header to the data signal includes the step of inserting a device identifier into the header.

5. The method of claim 1 further comprising the step of inserting a start of packet synchronization code into the header.

6. A method of sending data from a source to a recipient over a channel in a contiguous sequence, the method comprising the steps of:
    appending a header to a data signal, the header including a length information corresponding to a length of the data signal and a packet control word repeated twice;
    transmitting the header and data signal over the channel, the data signal being transmitted in a contiguous sequence; and
    receiving the header and data signal, the length information corresponding to the length of the data signal being used to receive the data signal aligned in the same contiguous sequence as it was transmitted including the information corresponding to the length of the data signal.

7. The method of claim 6, wherein the step of forming a packet control word further comprises the step of inserting a device identifier into the packet control word.

8. The method of claim 6 wherein the step of appending the header to the data signal further comprises the step of inserting a start of packet synchronization code in the header.

9. The method of claim 6, further comprising the step, prior to the step of appending a header to the data signal, of converting the data signal into a data packet.

10. The method of claim 9 wherein the step of converting the data signal into a data packet comprises the step of converting the data signal into at least one data word.

11. The method of claim 10 wherein the step of appending a header to the data signal further comprises the step of determining the number of data words formed, the number of data words form comprising the length information corresponding to the length of the data signal.

12. The method of claim 6 wherein the step of transmitting the header and data signal over the channel comprises the steps of:
    transmitting the start of packet synchronization code;
    transmitting the packet control word repeated twice; and
    transmitting the data signal.

13. The method of claim 6 further comprising the steps of:
    transmitting the data signal to a device associated with a device identifier included in the header.

14. The method of claim 6 wherein the step of receiving the header and data signal further comprises the steps of:
    detecting a start of packet synchronization code; and
    detecting a packet control word.

15. The method of claim 14 further comprising the step of recovering the data signal, the method including the steps of:
    storing a series of data bits comprising the data signal;
    comparing a value of a number of the data bits stored to the information corresponding to the length of the data signal; and
    determining an end of the data signal when the value of the number of data bits stored is equivalent to the information corresponding to the length of the data signal.

16. The method of claim 14 wherein the step of detecting the start of packet synchronization code comprises the steps of:
    receiving a first set of data bits corresponding to a beginning of a data packet frame;
    determining if the first set of data bits is equivalent to a stored value corresponding to the start of packet synchronization code.

17. The method of claim 14 wherein the step of detecting the packet control word comprises the steps of:
    comparing a first set of data bits following the start of packet synchronization code to a second set of bits following the first set of bits;
    identifying the first set of bits as the packet control word if the first set of bits corresponds to the second set of bits.

18. The method of claim 6, further comprising the step, before the step of appending a header to the data signal, of receiving a data signal from a peripheral computer interconnect ("PCI") compliant sensor.

19. A method of sending data from a source to a recipient over a channel in a contiguous sequence, the method comprising the steps of:
    appending a header to a data signal, the header including a length information corresponding to a length of the data signal;

transmitting the header and data signal over the channel by transmitting the start of packet synchronization code, transmitting the packet control word repeated twice and transmitting the data signal in a contiguous sequence;

receiving the header and data signal, the length information corresponding to the length of the data signal being used to receive the data signal aligned in the same contiguous sequence as it was transmitted.

20. A method of sending data from a source to a recipient over a channel in a contiguous sequence, the method comprising the steps of:

appending a header to a data signal, the header including a length information corresponding to a length of the data signal;

transmitting the header and data signal over the channel, the data signal being transmitted in a contiguous sequence;

receiving the header and data signal by detecting a start of packet synchronization code and detecting a packet control word, the packet synchronization code being detected by receiving a first set of data bits corresponding to a beginning of a data packet frame and determining if the first set of data bits is equivalent to a stored value corresponding to the start of packet synchronization code; and using the length information corresponding to the length of the data signal to receive the data signal aligned in the same contiguous sequence as it was transmitted.

21. A method of sending data from a source to a recipient over a channel in a contiguous sequence, the method comprising the steps of:

appending a header to a data signal, the header including a length information corresponding to a length of the data signal;

transmitting the header and data signal over the channel, the data signal being transmitted in a contiguous sequence;

receiving the header and data signal by detecting a start of packet synchronization code and detecting a packet control word, the packet control word being detected by:

comparing a first set of data bits following the start of packet synchronization code to a second set of bits following the first set of bits; and identifying the first set of bits as the packet control word if the first set of bits corresponds to the second set of bits; and using the length information corresponding to the length of the data signal to receive the data signal aligned in the same contiguous sequence as it was transmitted.

* * * * *